UNITED STATES PATENT OFFICE.

GUSTAV ADOLF WELTER, OF CREFELD, GERMANY, ASSIGNOR TO KUCHLER & BUFF, OF SAME PLACE.

AMIDOALKYLSALICYLIC ACID.

SPECIFICATION forming part of Letters Patent No. 563,993, dated July 14, 1896.

Application filed June 24, 1893. Serial No. 478,734. (Specimens.)

*To all whom it may concern:*

Be it known that I, GUSTAV ADOLF WELTER, doctor of philosophy, a subject of the King of Prussia, German Emperor, residing at Crefeld, in the Kingdom of Prussia, Germany, have invented new and useful Improvements in the Manufacture of Amidoalkylsalicylic Acid and Acetamidoalkylsalicylic Acid, of which the following is a specification.

If methyl or ethyl salicylic acid be treated with nitric acid of 1.2 specific gravity, (1:2:5, COOH:OR:NO$_2$,) nitroalkylsalicylic acids will be obtained, (Kraus Ann., 150, p. 6; Salkowsky Ann., 173, p. 41.) For commercial manufacture it is preferable to use nitric-sulfuric acid.

A. By means of reducing-agents, such as zinc-dust, iron with hydrochloric acid, tin with hydrochloric acid, tin with acetic acid, alcoholic ammonium sulfid under pressure, &c., the said nitro products are readily transformed into the corresponding amido compounds.

Example: Six kilos of nitromethylsalicylic acid are digested for some hours with ten kilos of tin and the corresponding quantity of hydrochloric acid, at a temperature of 100° centigrade, until all has become dissolved. The solution is then evaporated to dryness and the residue is again taken up in water and the tin is removed in the known manner. The filtrate contains the hydrochloric-acid salt of amidomethylsalicylic acid, which, after considerable concentration of the solution, solidifies on cooling to a crystalline magma of fine colorless needles.

The salts are all easily soluble in water, whether on the one hand with mineral acids or on the other hand with alkalies and alkaline earths. With iron chlorid no color reaction is produced.

The hydrochlorid of the amidoethylsalicylic acid crystallizes also in very easily soluble needles or four-sided plates. If the solution of the hydrochlorid be mixed cold with platinum chlorid, the platinum double salt separates in fine and small yellow needles.

B. The above-described amido compounds or their salts can readily be transformed by means of glacial acetic acid, acetyl chlorid, or acetic anhydrid into the corresponding acetyl compounds. These acetyl bodies are best obtained if the reduction of the nitro products is directly effected in glacial acetic acid.

Example: Six kilos of nitromethylsalicylic acid and ten kilos of tin are mixed cold with forty kilos of glacial acetic acid. The mass becomes heated and boils. The temperature is maintained for some hours at 100° centigrade, after which the mass is poured into four hundred liters of water and boiled for some time, after which it is filtered. From the solution there then separates the acetylamidomethylsalicylic acid in colorless strong crystals, which dissolve with extremely great difficulty in water. On recrystallizing from this solvent the acetyl product separates in silky lustrous small needles, which melt at 206° to 207° centigrade. The salts of the alkalies and alkaline earths are easily soluble in water. The corresponding ethyl compound crystallizes in lustrous silky needles of a melting-point of 189° to 190° centigrade.

The above products are suitable for medicinal purposes.

Acetylamidoethylsalicylic acid is used as a remedy in neuralgia, nervous aches of every description, influenza, angina, &c., especially in nervous headaches. The dose for the latter disease is one gram. Disagreeable secondary symptoms, as nausea, tingling of the ears, or palpitation of the heart, do not accompany its use. In general the acid is administered in one to one and one-half gram doses, and, according to circumstances, in quantities from three to five grams per day.

The new product, acetylamidoalkylsalicylic acid, is soluble in five parts hot and forty-two parts cold alcohol; in sixty-five parts hot and twelve hundred parts cold water; soluble with difficulty in ether and chloroform, and more readily soluble in methyl alcohol.

I claim—

1. The process of manufacturing amidoalkylsalicylic acid consisting in treating (1:2:5,COOH:OR:NO$_2$) nitroalkylsalicylic acid with reducing agents, such as tin, substantially as above described.

2. The process of manufacturing acetylamidoalkylsalicylic acid, consisting in treating amidoalkylsalicylic acid with an acetyl compound, such as glacial acetic acid.

3. The herein-described process of manufacturing acetylamidoalkylsalicylic acid, consisting in treating nitroalkylsalicylic acid with a reducing agent, such as tin, in the presence of an acetyl compound, such as glacial or anhydrous acetic acid.

4. As a new product, acetylamidoalkylsalicylic acid, a colorless crystalline powder of the formula—

$$C_6H_3.(COOH)(OR.)(NH.CH_3CO)$$
$$\quad\ \ 1.\qquad\ \ 2.\qquad\ \ 5.$$

soluble in five parts hot and forty-two parts cold alcohol; in sixty-five parts hot and twelve hundred parts cold water; soluble with difficulty in ether and chloroform, and more readily soluble in methyl alcohol; said product being characterized by antipyretic and antineuralgic properties.

In testimony whereof I have signed my name to this specification in the presence of two subscribing witnesses.

GUSTAV ADOLF WELTER.

Witnesses:
 EVANS BLAKE,
 W. A. BLAKE.